United States Patent
Park et al.

(10) Patent No.: US 10,824,043 B2
(45) Date of Patent: Nov. 3, 2020

(54) OPTICAL MODULATING DEVICE AND APPARATUS INCLUDING THE SAME

(71) Applicant: SAMSUNG ELECTRONICS CO., LTD., Suwon-si (KR)

(72) Inventors: Junghyun Park, Seoul (KR); Sangwook Kim, Seongnam-si (KR); Sunil Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 16/134,614

(22) Filed: Sep. 18, 2018

(65) Prior Publication Data
US 2019/0369457 A1    Dec. 5, 2019

(30) Foreign Application Priority Data
May 30, 2018 (KR) .................. 10-2018-0062135

(51) Int. Cl.
*G02F 1/19* (2019.01)
*G02F 1/01* (2006.01)
(Continued)

(52) U.S. Cl.
CPC .............. *G02F 1/19* (2013.01); *G01S 7/4817* (2013.01); *G02B 5/008* (2013.01); *G02B 6/12* (2013.01);
(Continued)

(58) Field of Classification Search
CPC . G02F 1/01; G02F 1/0102; G02F 1/19; G02F 1/29; G02F 1/292; G02F 1/13439; G02F 2202/30; G02F 2202/36; G02F 2203/02; G02F 2203/10; G02F 2203/24; G02B 6/12; G02B 6/12002; G02B 6/12004; G02B 6/12014; G02B 5/008; G02B 2006/12104; G02B 1/002; G05D 1/00; G01S 7/4817; G01S 17/36; B82Y 20/00
(Continued)

(56) References Cited

U.S. PATENT DOCUMENTS

| 5,610,740 A | 3/1997 | Kamamori et al. |
| 6,849,914 B2 | 2/2005 | day |

(Continued)

FOREIGN PATENT DOCUMENTS

| JP | 2004-125921 A | 4/2004 |
| KR | 10-1992-0020246 A | 11/1992 |

(Continued)

*Primary Examiner* — Michael P Mooney
(74) *Attorney, Agent, or Firm* — Sughrue Mion, PLLC

(57) ABSTRACT

An optical modulation device and an apparatus including the same are provided. The optical modulation device may include a reflector, a nano-antenna array placed opposite to the reflector, and an active layer that is placed between the reflector and the nano-antenna array. The optical modulation device may further include a first insulating layer placed between the reflector and the active layer, a second insulating layer placed between the active layer and the nano-antenna array, and a wiring structure that electrically contacts the active layer. The wiring structure may be provided in at least one of a first place between the active layer and the first insulating layer and a second place between the active layer and the second insulating layer.

20 Claims, 21 Drawing Sheets

(51) Int. Cl.
*G02B 5/00* (2006.01)
*G02F 1/1343* (2006.01)
*G01S 7/481* (2006.01)
*G02B 6/12* (2006.01)
*B82Y 20/00* (2011.01)

(52) U.S. Cl.
CPC ........ *G02F 1/0102* (2013.01); *G02F 1/13439* (2013.01); *B82Y 20/00* (2013.01); *G02F 2203/10* (2013.01)

(58) Field of Classification Search
USPC .......................................................... 385/1–8
See application file for complete search history.

(56) References Cited

U.S. PATENT DOCUMENTS

| | | | |
|---|---|---|---|
| 9,547,186 B2 | 1/2017 | Han et al. | |
| 2016/0170237 A1* | 6/2016 | Han | G02F 1/01 |
| | | | 359/241 |
| 2019/0025509 A1* | 1/2019 | Kim | G01S 7/4817 |

FOREIGN PATENT DOCUMENTS

| KR | 10-2001-0093640 A | 10/2001 |
|---|---|---|
| KR | 10-2012-0077417 A | 7/2012 |

\* cited by examiner

< COMPARATIVE EXAMPLE >

< COMPARATIVE EXAMPLE >

OPTICAL MODULATING DEVICE AND APPARATUS INCLUDING THE SAME

CROSS-REFERENCE TO RELATED APPLICATION

This application claims priority from Korean Patent Application No. 10-2018-0062135, filed on May 30, 2018 in the Korean Intellectual Property Office, the disclosure of which is incorporated herein by reference in its entirety.

BACKGROUND

1. Field

Apparatuses and methods consistent with exemplary embodiments relate to an optical modulation device and an apparatus including the same.

2. Description of the Related Art

Optical devices that change transmission/reflection characteristics, phase, amplitude, polarization, strength, passage, and the like of light are used in various optical apparatuses. Optical modulators having various structures have been introduced to control the above-mentioned optical characteristics in a desired way in an optical system. For example, a liquid crystal having optical anisotropy or a microelectromechanical system (MEMS) structure using delicate mechanical movements of a light shielding/reflection element is being used in general optical modulators. Such an optical modulator has a slow operation response time greater than several μs due to characteristics of driving methods.

Recently, there have been attempts to use a nano structure, which uses a surface plasmon resonance phenomenon with respect to an incident light, in optical devices.

SUMMARY

One or more exemplary embodiments provide optical modulation devices that modulate light in non-mechanical method with an excellent performance.

Further, one or more exemplary embodiments provide non-mechanical type optical modulation devices capable of increasing an operation speed (e.g., a response speed).

Further, one or more exemplary embodiments provide optical apparatuses including the optical modulation devices.

According to an aspect of an exemplary embodiment, there is provided an optical modulation device including: a reflector; a nano-antenna array placed opposite to the reflector and including a plurality of nano-antennas; an active layer that is placed between the reflector and the nano-antenna array and having properties that vary according to electrical conditions; a first insulating layer placed between the reflector and the active layer; a second insulating layer placed between the active layer and the nano-antenna array; and a wiring structure that is provided to electrically contact the active layer, in at least one of a first place between the active layer and the first insulating layer, and a second place between the active layer and the second insulating layer, and has a higher electrical conductivity than the active layer.

The wiring structure may be disposed around the plurality of nano-antennas.

The wiring structure may be provided at an edge region of the active layer and surround an internal region of the active layer.

The wiring structure may include a first wiring unit provided at the edge region of the active layer; and a second wiring unit that crosses the internal region that is inner than the edge region of the active layer.

The second wiring unit may be placed to connect a first part and a second part of the first wiring unit.

The wiring structure may have a grid form.

The wiring structure may be disposed around each of the plurality of nano-antennas.

The wiring structure may be placed not to overlap the plurality of nano-antennas.

The wiring structure may include a metal or an alloy.

The optical modulation device may be configured to apply a reference voltage to the active layer via the wiring structure.

The optical modulation device may be configured to independently apply voltages respectively to at least two of the reflector, the active layer, and the nano-antenna array.

The reflector may include a plurality of reflector members disposed apart from one another, and the plurality of reflector members may be placed to correspond to the plurality of nano-antennas.

The optical modulation device may be configured to independently apply a first voltage to each of the plurality of reflector members and independently apply a second voltage to each of the plurality of nano-antennas.

The wiring structure may include at least one of a first wiring structure, which is provided between the active layer and the first insulating layer, and a second wiring structure that is provided between the active layer and the second insulating layer.

The active layer may include an electro-optic material having permittivity that varies according to an electrical signal applied to the electro-optic material.

The active layer may include at least one of a transparent conductive oxide and a transition metal nitride.

The optical modulation device may be configured to derive phase modulation of a light that is reflected by the nano-antennas.

According to one or more exemplary embodiments, an optical apparatus includes the optical modulation device that is described above.

The optical apparatus may be configured to steer a beam one-dimensionally or two-dimensionally by using the optical modulation device.

The optical apparatus may, for example, include at least one of a Light Detection And Ranging (LiDAR) apparatus, a three-dimensional image acquisition apparatus, a holographic display apparatus, and a structured light generation apparatus.

BEST DESCRIPTION OF THE DRAWINGS

The above and/or other aspects will be more apparent by describing certain exemplary embodiments, with reference to the accompanying drawings, in which.

DETAILED DESCRIPTION

Figure 1A:
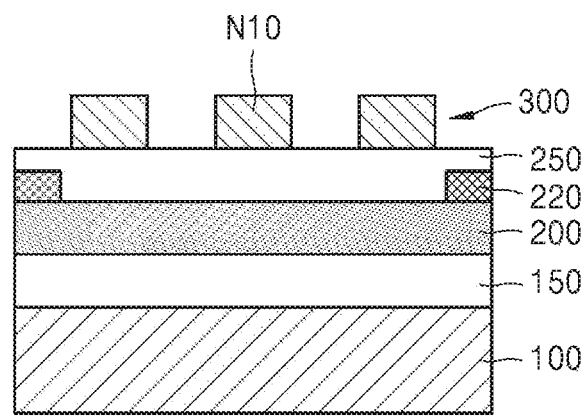
FIG. 1A is a cross-sectional view showing an optical modulation device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1B:
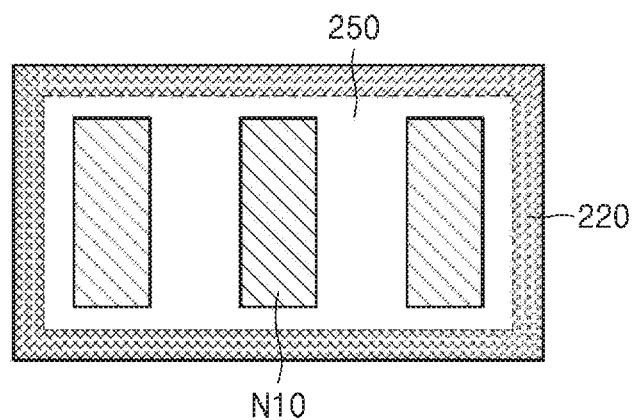
FIG. 1B is a plan view of the optical modulation device shown in FIG. 1A.

FIG. 1A is a cross-sectional view showing an optical modulation device according to an exemplary embodiment. FIG. 1B is a top-plan view of the optical modulation device shown in FIG. 1A.

Referring to FIGS. 1A and 1B, an optical modulation device may include a reflector 100, a nano-antenna array 300 including a plurality of nano-antennas N10 placed opposite to the reflector 100, and an active layer 200 that is placed between the reflector 100 and the nano-antenna array 300 and having properties that are changed according to electrical conditions. In addition, the optical modulation device may further include a first insulating layer 150 placed between the reflector 100 and the active layer 200, and a second insulating layer 250 placed between the active layer 200 and the nano-antenna array 300. In addition, the optical modulation device may further include a wiring structure 220 that is arranged to electrically contact the active layer 200 in a first place between the active layer 200 and the first insulating layer 150, a second place between the active layer 200 and the second insulating layer 250, or the first and the second places. FIG. 1A shows a case in which the wiring structure 220 is arranged in the first place between the active layer 200 and the second insulating layer 250. The wiring structure 220 may have electrical conductivity that is higher than that of the active layer 200. The electrical conductivity of the wiring structure 220 may be equal to or more than 1.5 times or 2 times the electrical conductivity of the active layer 200. However, the electrical conductivity of the wiring structure 220 is not limited thereto.

The reflector 100 may be a back reflector electrode that is placed below the active layer 200. That is, the reflector 100 may, while reflecting lights, simultaneously function as an electrode. The reflector 100 may be optically coupled to the nano-antennas N10, and light may be reflected by optical interactions between the nano-antennas N10 and the reflector 100. The reflector 100 may include a certain conductive material such as a metal. For example, the reflector 100 may include at least one of metals selected from among copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), gold (Au), and the like, and may also include an alloy including at least one of the above-mentioned metals. Alternatively, the reflector 100 may include a thin film in which metal nanoparticles, for example, Au and Ag, are scattered, carbon nano structures, for example, graphene or carbon nanotube (CNT), conductive polymers, for example, poly (3,4-ethylenedioxythiophene) (PEDOT), polypyrrole (PPy), poly (3-hexylthoiophene) (P3HT), or may also include a conductive oxide, and the like.

The nano-antenna N10 converts light (including incident light, a visible electromagnetic wave, and an invisible electromagnetic wave) of a certain wavelength (or frequency) to localized surface plasmon resonance and captures an energy thereof. In other words, the nano-antenna N10 may be an antenna having a nano structure for lights. The nano-antennas N10 may be a conductive layer pattern (e.g., a metal layer pattern), and the conductive layer pattern may be attached to a non-conductive layer (e.g., a dielectric layer). Plasmon resonance may occur on an interface between the conductive layer pattern and the non-conductive layer (e.g., the dielectric layer). In this case, the non-conductive layer (e.g., the dielectric layer) may be the second insulating layer 250, or may be arranged as a layer that is separate from the second insulating layer 250. For convenience, hereinafter, the conductive pattern itself will be considered as the nano-antennas N10 and described. Like an interface between the conductive layer pattern and the non-conductive layer (e.g., the dielectric layer), an interface on which surface plasmon resonance occurs may collectively be referred to as a "meta surface" or a "meta structure".

The nano-antenna N10 may be formed from a conductive material and may have a size of a sub-wavelength. In this case, the sub-wavelength indicates a size that is smaller than an operating wavelength of the nano-antenna N10. Any size that forms the shape of the nano-antenna N10, that is, a thickness, a vertical length, a horizontal length, or a gap between each nano-antenna N10, may have a size of the sub-wavelength. A resonance wavelength may be changed according to the form or the size of the nano-antenna N10.

A highly conductive metal material, in which surface plasmon excitation may occur, may be used as a conductive material forming the nano-antenna N10. For example, at least one metal selected from among Cu, Al, Ni, Fe, Co, Zn, Ti, Ru, Rh, Pd, Pt, Ag, Os, Ir, Au, and the like may be used, and an alloy including at least one of the above-mentioned metals may be used. Alternatively, the nano-antenna N10 may include a thin film in which metal nanoparticles, for example, Au and Ag, are dispersed, carbon nanostructures, for example, graphene or CNT, a conductive polymer, for example, PEDOT, PPy, and P3HT, or may also include a conductive oxide and the like.

The active layer 200 may be a layer having properties according to electrical conditions of the active layer 200. According to the electrical conditions related to the active layer 200 and a peripheral region of the same, the permittivity or refractivity of the active layer 200 may be changed. The change in permittivity of the active layer 200 may be based on change in charge concentration (charge density) of region(s) in the active layer 200. In other words, the permittivity of the active layer 200 may be changed due to the change in the charge concentration of the region(s) in the active layer 200. According to an electric field or a voltage applied to the active layer 200, the permittivity of the active layer 200 may be changed. The active layer 200 may, for example, include a transparent conductive oxide (TCO) like indium tin oxide (ITO), indium zinc oxide (IZO), aluminum zinc oxide (AZO), gallium zinc oxide (GZO), aluminum gallium zinc oxide (AGZO), gallium indium zinc oxide (GIZO). Alternatively, the active layer 200 may include a transition metal nitride (TMN), for example, titanium nitride (TiN), zirconium nitride (ZrN), hafnium nitride (HfN), and tantalum nitride (TaN). In addition, the active layer 200 may include an electro-optic (EO) material having effective permittivity that is changed in response to electrical signals. The EO material may include a crystalline material, for example, lithium niobate (LiNbO$_3$), lithium tantalate (LiTaO$_3$), potassium tantalate niobate (KTN), lead zirconate titanate (PZT), and the like, and may also include various kinds of polymers having electro-optic characteristics.

The first insulating layer 150 and the second insulating layer 250 may include insulating materials (e.g., dielectric materials). At least one of the first insulating layer 150 and the second insulating layer 250 may include at least one of an insulating silicon compound and an insulating metal compound. The insulating silicon compound may include, for example, silicon oxide (SiOx), silicon nitride (SixNy), silicon oxynitride (SiON), and the like, and the insulating metal compound may include, for example, aluminum oxide (Al$_2$O$_3$), hafnium oxide (HfO), zirconium oxide (ZrO), hafnium silicon oxide (HfSiO), and the like. However, the particular materials included in the first insulating layer 150 and the second insulating layer 250 mentioned herein are only illustrative and are not limited thereto. The first insulating layer 150 and the second insulating layer 250 may be formed from one same material, or may respectively include different materials.

By the first insulating layer 150, the active layer 200 may be electrically separated (insulated) from the reflector 100, and by the second insulating layer 250, the active layer 200 may be electrically separated (insulated) from the nano-antenna N10. According to a voltage applied between the reflector 100 and the active layer 200, charge concentration in a first region of the active layer 200 may be changed. In addition, according to a voltage applied between the active layer 200 and the nano-antenna N10, charge concentration in a second region of the active layer 200 may be changed. The first region of the active layer 200 may be placed adjacent to the first insulating layer 150, and the second region of the active layer 200 may be placed adjacent to the second insulating layer 250. The first region and the second region may respectively be divided into a plurality of unit regions, and may, according to electrical signals, be charge accumulation regions or charge depletion regions. When a voltage applied to the nano-antenna N10 is higher than a voltage applied to the active layer 200, a charge accumulation region may be formed above the active layer 200. When the voltage applied to the nano-antenna N10 is lower than the voltage applied to the active layer 200, a charge depletion region may be formed above the active layer 200. When a voltage applied to the reflector 100 is higher than a voltage applied to the active layer 200, a charge accumulation region may be formed below the active layer 200. When the voltage applied to the reflector 100 is lower than the voltage applied to the active layer 200, a charge depletion region may be formed below the active layer 200. Due to the formation of the charge accumulation region and/or the charge depletion region in the active layer 200, reflection characteristic of the optical modulation device may be controlled. The beam may be scanned by controlling a direction of reflected light by using a gap between reflection phases of the nano-antennas N10. By independently controlling the charge concentration of the first region and the second region of the active layer 200, the optical modulation characteristics may be improved and problems like noise may also be reduced.

The wiring structure 220 may include a material having excellent electrical conductivity. That is, the wiring structure 220 may be formed from metals, for example, Au, Ag, Cu, and the like. However, the exemplary embodiments are not limited thereto. The wiring structure 220 may be formed from various kinds of metals or alloys. An electrical signal (e.g., a voltage signal) to be applied to the active layer 200 may be uniformly distributed to the entire active layer 200 at a high speed, via the wiring structure 220. As shown in FIG. 1B, the wiring structure 220 may, as seen from above (i.e., from a top-view perspective), may surround at least a part of the plurality of nano-antennas N10. For example, the wiring structure 220 in a first plane may be arranged around the plurality of nano-antennas N10 in a second plane different from the first plane. The wiring structure 220 may be arranged at an edge region of the active layer 200 and surround an internal area of the active layer 200. In this case, the wiring structure 220 may be placed not to overlap or cross the plurality of nano-antennas N10.

Figure 2A:
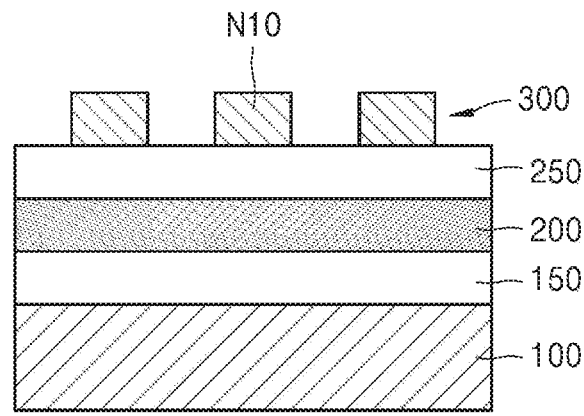
FIG. 2A is a cross-sectional view showing an optical modulation device according to a comparative example.
Figure 2B:
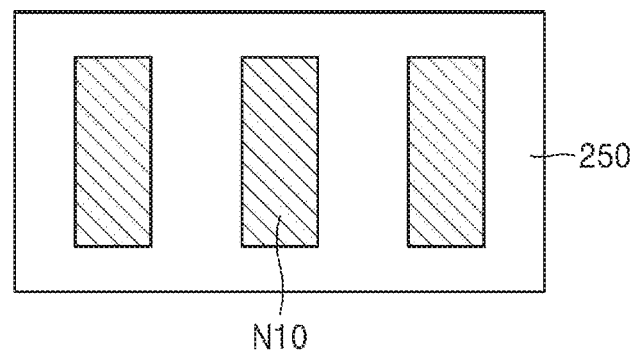
FIG. 2B is a plan view of the optical modulation device shown in FIG. 2A.

FIG. 2A is a cross-sectional view showing an optical modulation device according to a comparative example. FIG. 2B is a top-plan view of the optical modulation device shown in FIG. 2A.

Referring to FIGS. 2A and 2B, an optical modulation device according to the comparative example includes the reflector 100, the first insulating layer 150, the active layer 200, the second insulating layer 250, and the nano-antenna array 300. The nano-antenna array 300 includes the plurality of nano-antennas N10. The optical modulation device according to the comparative example does not include the wiring structure 220 described in FIGS. 1A and 1B.

Figure 3:
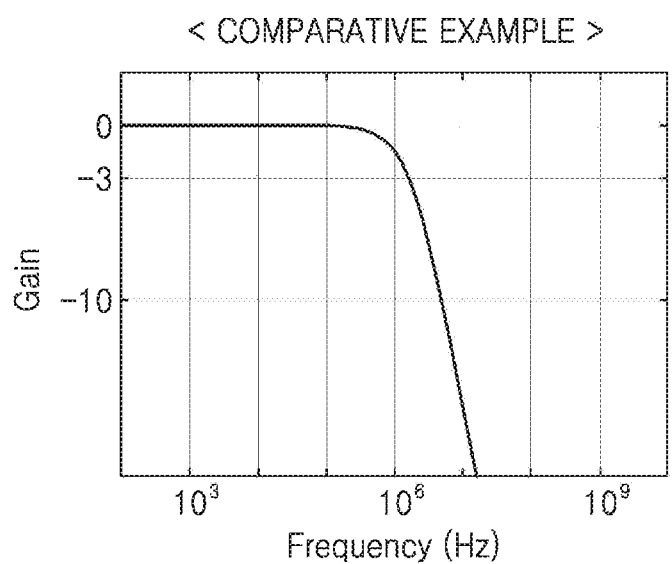
FIG. 3 is a graph showing change in a reflection characteristic according to a switching speed of the optical modulation device according to the comparative example shown in FIGS. 2A and 2B.

In the optical modulation device according to the comparative example, the active layer 200 may be placed between the first insulating layer 150 and the second insulating layer 250, and the active layer 200 may have a relatively high resistance. Accordingly, when an electrical signal (a voltage signal) is applied to the active layer 200, according to positions in the active layer 200, there may be a large time constant, that is, a time period required until the same or substantially the same voltages are applied to the active layer 200. As a result, when performing the beam scanning, an operation speed in switching a scanning position from one point to another point may be limited. FIG. 3 quantitatively shows the limitation to the operation speed.

FIG. 3 is a graph showing change in a reflection characteristic according to a switching speed of the optical modulation device according to the comparative example shown in FIGS. 2A and 2B. In other words, FIG. 3 shows a frequency response characteristic of the optical modulation device according to the comparative example.

Referring to FIG. 3, the horizontal axis indicates frequency (Hz) corresponding to a switching speed (e.g., operation speed) of the optical modulation device, and the vertical axis indicates gain representing change in a reflection characteristic that is changed by switching. As the operation speed is increased, due to the high resistance of the active layer 200, a voltage may not be entirely (e.g., rapidly and uniformly) applied to the active layer 200, and thus, change in the reflection characteristic decreases. An operation speed at which the change in the reflection characteristic is reduced by half is referred to as 3 dB-cutoff frequency. The optical modulation device according to the comparative embodiment has a relatively low 3 dB-cutoff frequency, and thus, the operation speed may be limited.

Figure 4:
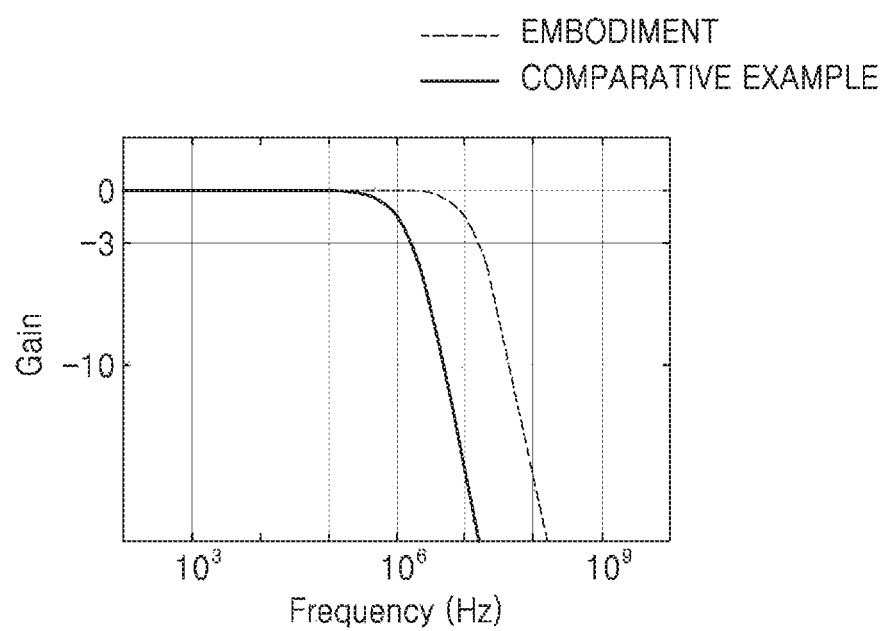
FIG. 4 is a graph showing comparison of a frequency response characteristic of the optical modulation device according to the comparative example and the exemplary embodiment.

FIG. 4 is a graph showing comparison of a frequency response characteristic of the optical modulation device according to the comparative example and the exemplary embodiment. In this case, the comparative example corresponds to the optical modulation device in FIGS. 2A and 2B, and the exemplary embodiment corresponds to the optical modulation device in FIGS. 1A and 1B.

Referring to FIG. 4, the solid line graph corresponding to the comparative example shows a result in which an operation speed is slow and a 3 dB-cutoff frequency is low due to a high resistance of the active layer when no wiring structure is provided. The broken line graph corresponding to the exemplary embodiment shows a result in which an operation speed is high and a 3 dB-cutoff frequency is high as the wiring structure compensates for the high resistance of the active layer.

Figure 5A:
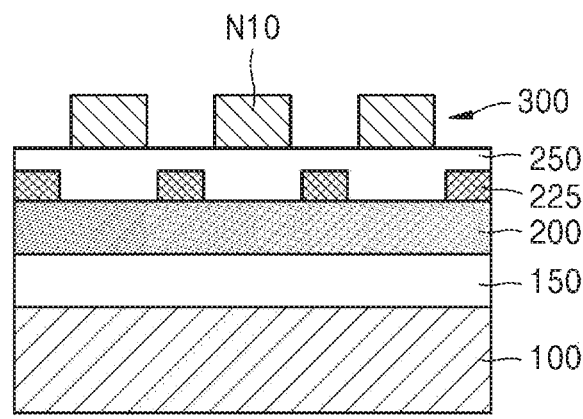
FIG. 5A is a cross-sectional view showing an optical modulation device according to another exemplary embodiment.
Figure 5B:
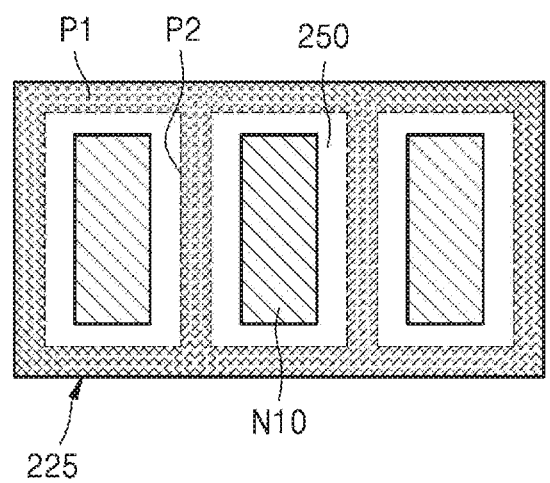
FIG. 5B is a plan view of the optical modulation device shown in FIG. 5A.

FIG. 5A is a cross-sectional view showing an optical modulation device according to another exemplary embodiment. FIG. 5B is a top-plan view of the optical modulation device shown in FIG. 5A.

Referring to FIGS. 5A and 5B, the optical modulation device may include the reflector 100, the first insulating layer 150, the active layer 200, the second insulating layer 250, and the nano-antenna array 300, and may further include a wiring structure 225 that electrically contacts the active layer 200.

The wiring structure 225 may include a first wiring unit P1 provided at an edge region of the active layer 200 and at least one second wiring unit P2 provided in an internal region that is inner than the edge region of the active layer 200. The second wiring unit P2 may be placed to connect a first part (the first region) and a second part (the second region) of the first wiring unit P1. The wiring structure 225 may have a grid form. The wiring structure 225 may, as seen from above, surround each of the plurality of nano-antennas N10. In this case, the wiring structure 225 may be placed not to overlap or cross the plurality of the nano-antennas N10.

As described above, an additional wiring, that is, the second wiring unit P2, which is used for reduction of resistance, may be placed between the nano-antennas N10. In this case, compared to when a wiring structure is arranged only at a periphery of the active layer 200, the time for applying a voltage to a central region of the active layer 200 may be reduced, and thus, the operation speed increases.

Figure 6:
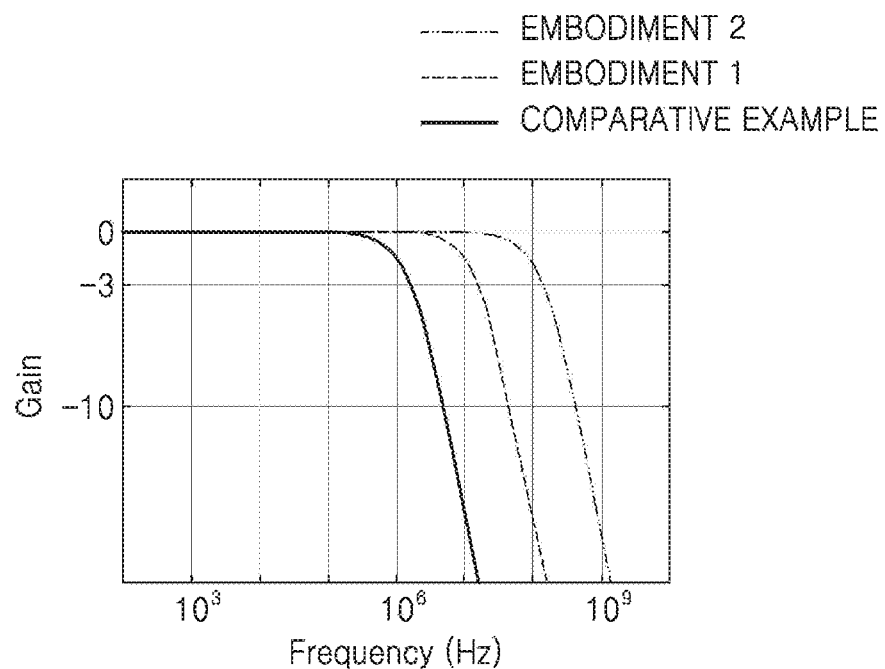
FIG. 6 is a graph showing comparison of a frequency response characteristic of the optical modulation device according to the comparative example, exemplary embodiment 1, and exemplary embodiment 2.

FIG. 6 is a graph showing comparison of a frequency response characteristic of the optical modulation device according to a comparative example, exemplary embodiment 1, and exemplary embodiment 2. In this case, the comparative example corresponds to the optical modulation device shown in FIGS. 2A and 2B, exemplary embodiment 1 corresponds to the optical modulation device shown in FIGS. 1A and 1B, and exemplary embodiment 2 corresponds to the optical modulation device shown in FIGS. 5A and 5B.

Referring to FIG. 6, the solid line graph corresponding to the comparative example and the broken line graph corresponding to exemplary embodiment 1 are the same as the graphs shown in FIG. 4. The dashed line graph corresponding to exemplary embodiment 2; i.e., a graph showing a case of the resistance that is further reduced by arranging additional wirings between the nano-antennas N10, shows a result in which the 3 dB-cutoff frequency is further increased compared to the 3 dB-cutoff frequency in exemplary embodiment 1.

Figure 7:
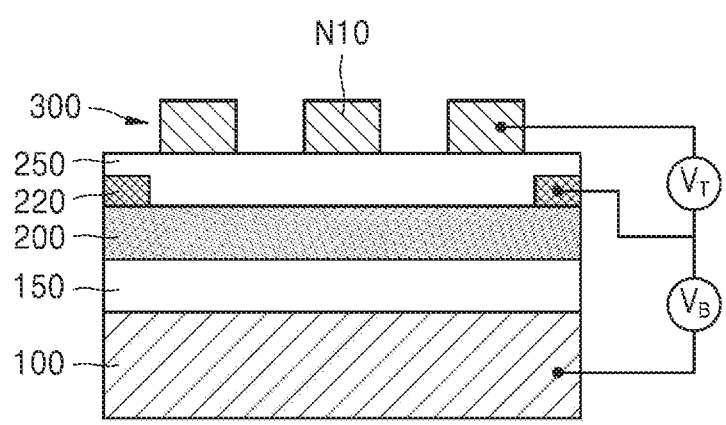
FIG. 7 is a cross-sectional view showing a case of a signal applying unit connected to the optical modulation device and applying electrical signals to the optical modulation device, according to an exemplary embodiment.

FIG. 7 is a cross-sectional view showing a case of a signal applying unit applying electrical signals to the optical modulation device, according to an exemplary embodiment;

Referring to FIG. 7, the optical modulation device may include a signal applying unit (e.g., a power supply or a voltage supply) that is configured to independently apply electrical signals to at least two of the reflector 100, the active layer 200, and the nano-antenna N10. The signal applying unit may be configured to independently apply a voltage to each of the reflector 100 and the nano-antenna N10. For example, the signal applying unit may include a first voltage applying unit $V_B$ for applying a first voltage between the reflector 100 and the active layer 200, and a second voltage applying unit $V_T$ for applying a second voltage between the active layer 200 and the nano-antenna N10. The first voltage applying unit $V_B$ may connect the reflector 100 to the wiring structure 220, and the second voltage applying unit $V_T$ may connect the wiring structure 220 to the nano-antenna N10. In this case, a certain reference voltage may be applied to the active layer 200 via the wiring structure 220. In this case, for convenience, a case of applying a voltage to only one of the plurality of nano-antennas N10 is applied, but a voltage may be independently applied to each of the plurality of nano-antennas N10.

The active layer 200 may include a first charge concentration change region, that is, a region in which a charge concentration is changed according to a voltage applied between the reflector 100 and the active layer 200 by the first voltage applying unit $V_B$. In addition, the active layer 200 may include a second charge concentration change region, that is, a region in which a charge concentration is changed according to a voltage applied between the active layer 200 and the nano-antenna N10 by the second voltage applying unit $V_T$. The first charge concentration change region may be provided adjacent to the first insulating layer 150, and the second charge concentration change region may be provided adjacent to the second insulating layer 250. The first charge concentration change region and the second charge concentration change region may be independently controlled.

Figure 8:
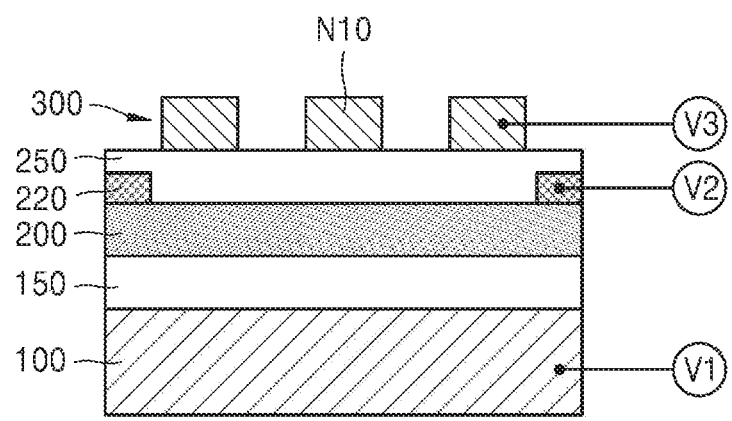
FIG. 8 is a cross-sectional view showing a case of a signal applying unit connected to the optical modulation device and applying electrical signals to the optical modulation device, according to another exemplary embodiment.

FIG. 8 is a cross-sectional view showing a case of a signal applying unit applying electrical signals to the optical modulation device, according to another exemplary embodiment.

Referring to FIG. 8, a signal applying unit used for applying electrical signals to the optical modulation device may be configured to independently apply a voltage to each of the reflector 100, the active layer 200, and the nano-antenna N10. The signal applying unit may include a first voltage applying unit V1 for applying a first voltage to the reflector 100, a second voltage applying unit V2 for applying a second voltage to the active layer 200, and a third voltage applying unit V3 for applying a third voltage to the nano-antenna N10. The second voltage applying unit V2 may be connected to the active layer 200 via the wiring structure 220. In this case, the first voltage may be greater or less than the second voltage. The third voltage may also be greater or less than the second voltage. In some cases, at least one of the first voltage and the third voltage may be equal to the second voltage. The second voltage may be a reference voltage for the first voltage and the third voltage. For convenience, a case of applying a voltage to only one of the plurality of nano-antennas N10 is shown, but a voltage may be independently applied to each of the plurality of nano-antennas N10.

FIGS. 9 through 12 are cross-sectional views showing optical modulation devices according to other exemplary embodiments.

Figure 9:
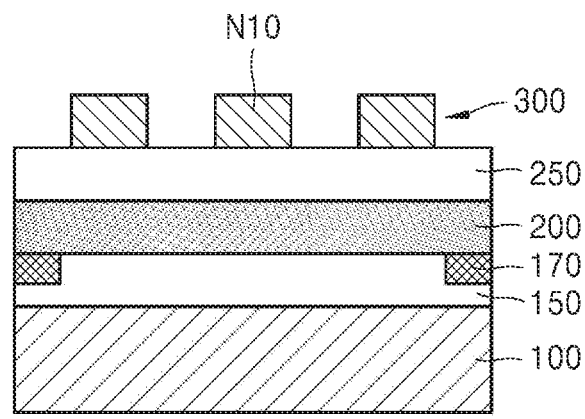
FIGS. 9 through 12 are cross-sectional views showing optical modulation devices according to other exemplary embodiments.

Referring to FIG. 9, a wiring structure 170 may be disposed at a position between the first insulating layer 150 and the active layer 200, which allows the wiring structure 170 to electrically contact the active layer 200. A planar shape of the wiring structure 170 may be equal or similar to that of the wiring structure 220 shown in FIG. 1B.

Figure 10:
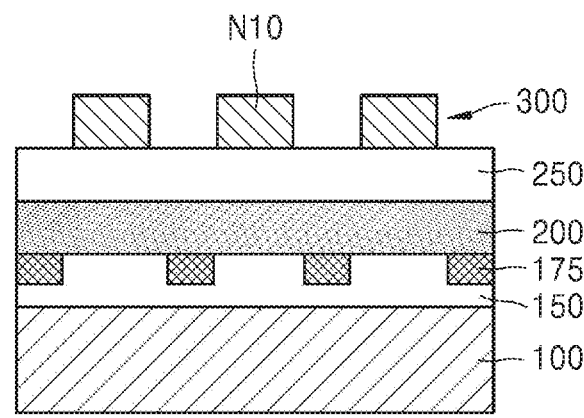

Referring to FIG. 10, a wiring structure 175 may be disposed at a position between the first insulating layer 150 and the active layer 200, which allows the wiring structure 175 to electrically contact the active layer 200. A planar form of the wiring structure 175 may be equal or similar to that of the wiring structure 225 shown in FIG. 5B. Although FIGS. 9 and 10 show cases in which the wiring structures 170 and 175 protrude toward the first insulating layer 150, the wiring structures 170 and 175 may also be formed to protrude toward the active layer 200, not toward the first insulating layer 150.

Figure 11:
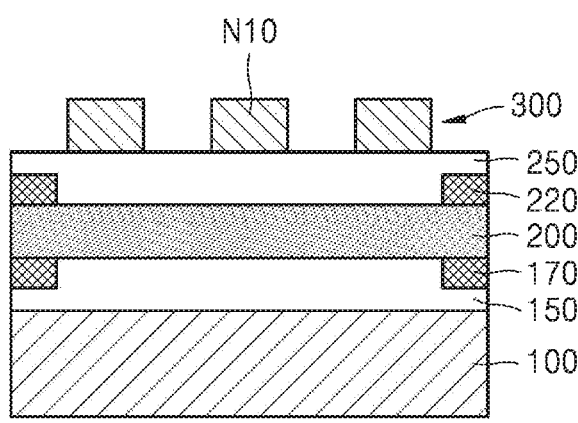

Referring to FIG. 11, a first wiring structure 170 may be arranged between the first insulating layer 150 and the active layer 200, and a second wiring structure 220 may be arranged between the second insulating layer 250 and the active layer 200.

Figure 12:
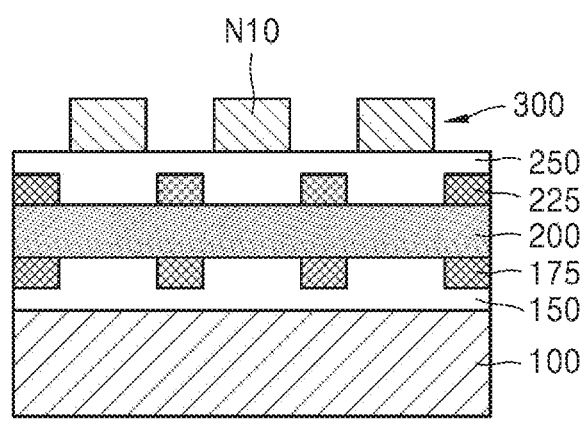

Referring to FIG. 12, a first wiring structure 175 may be arranged between the first insulating layer 150 and the active layer 200, and a second wiring structure 225 may be arranged between the second insulating layer 250 and the active layer 200. When a plurality of wiring structures are used as in FIGS. 11 and 12, a signal applying characteristic may be improved.

FIGS. 13 through 20 are top plan views showing planar structures of optical modulation devices according to various exemplary embodiments.

Figure 13:
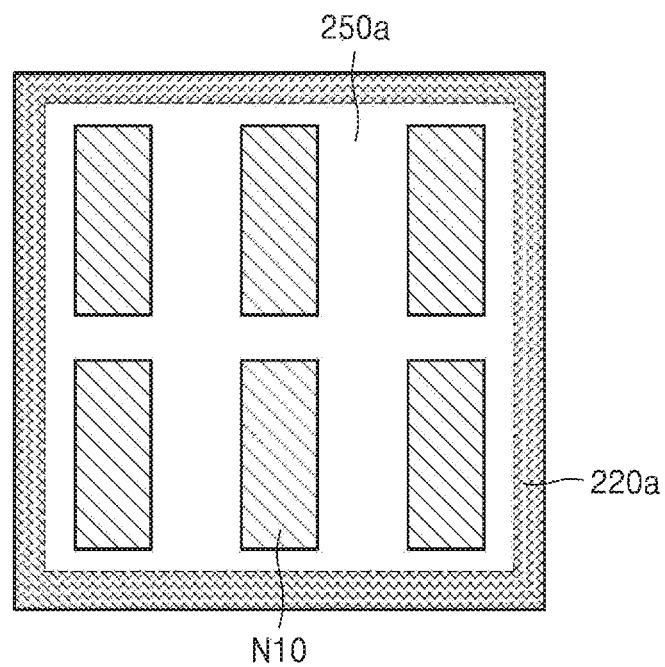
FIGS. 13 through 20 are plan views showing planar structures of optical modulation devices according to various exemplary embodiments.
Figure 14:
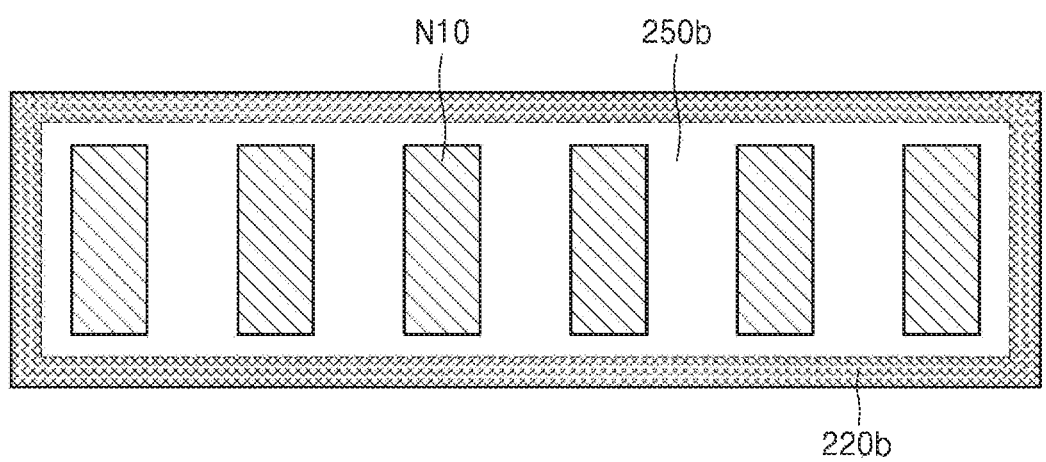
Figure 15:
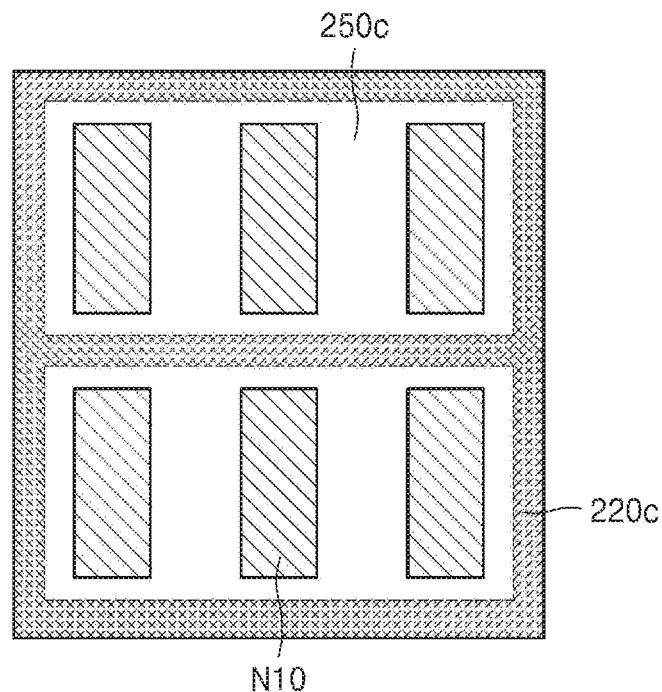
Figure 16:
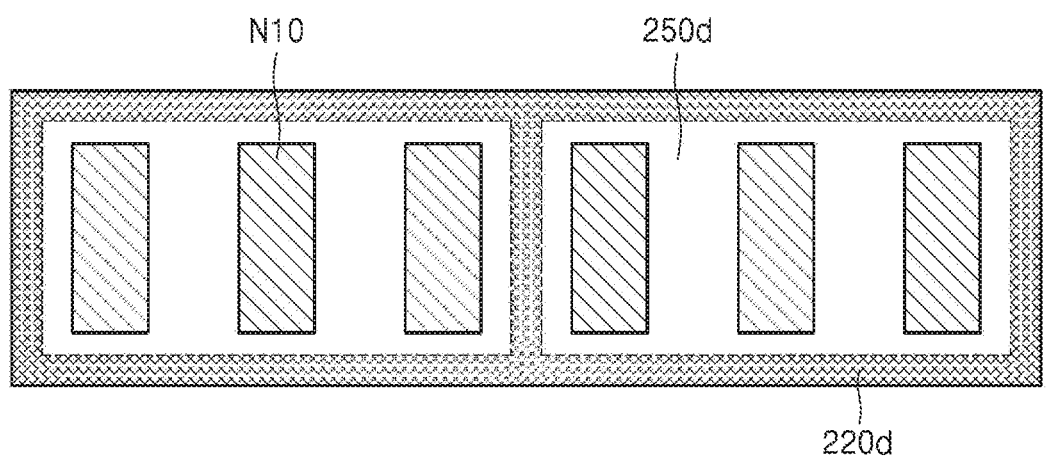
Figure 17:
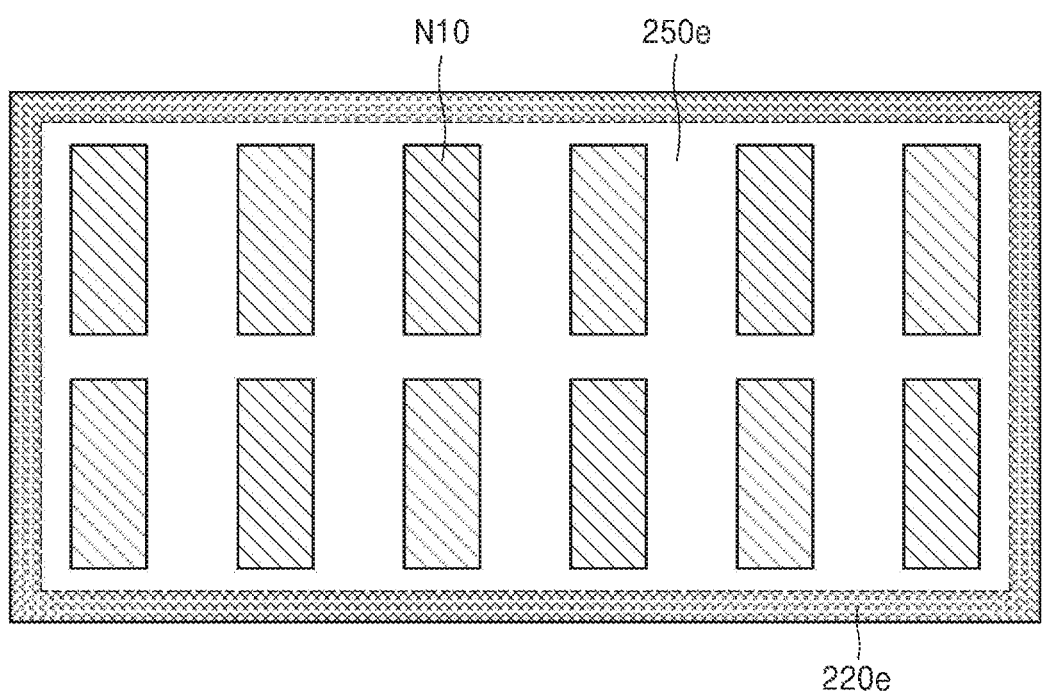
Figure 18:
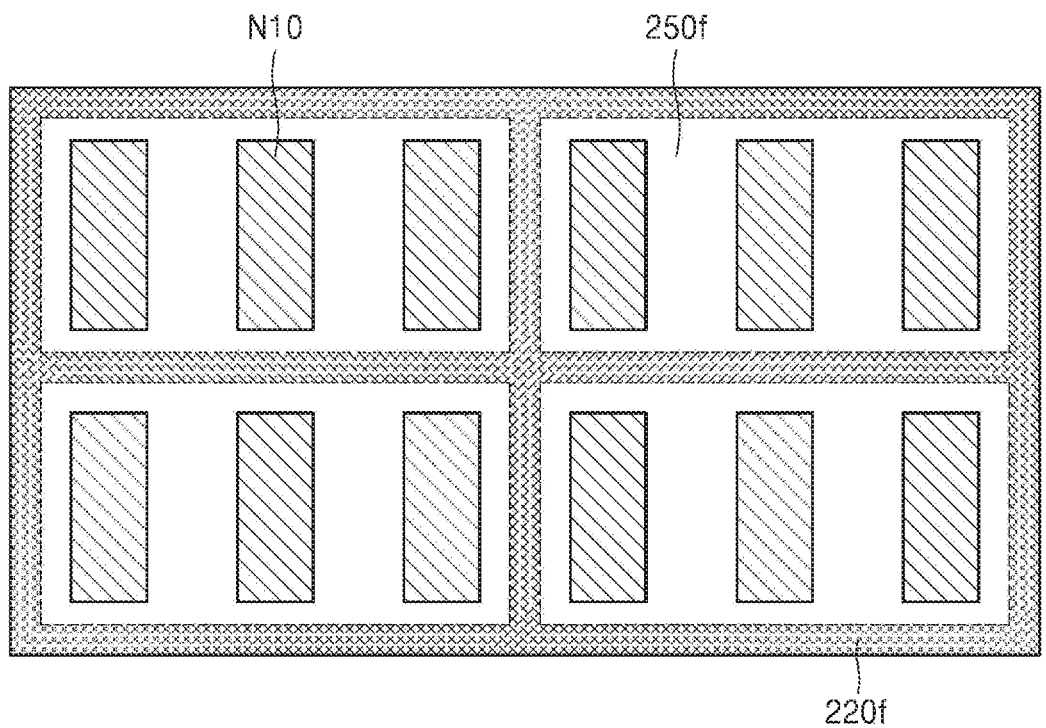
Figure 19:
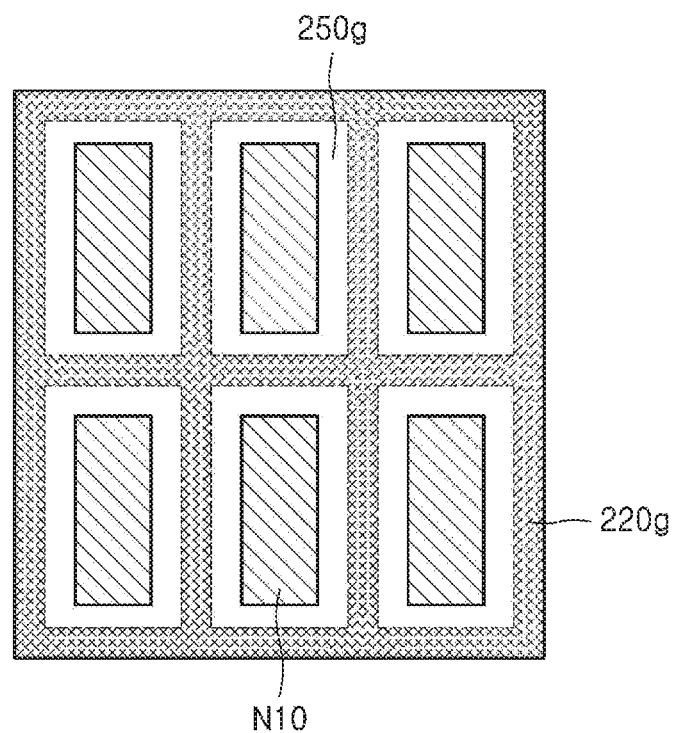
Figure 20:
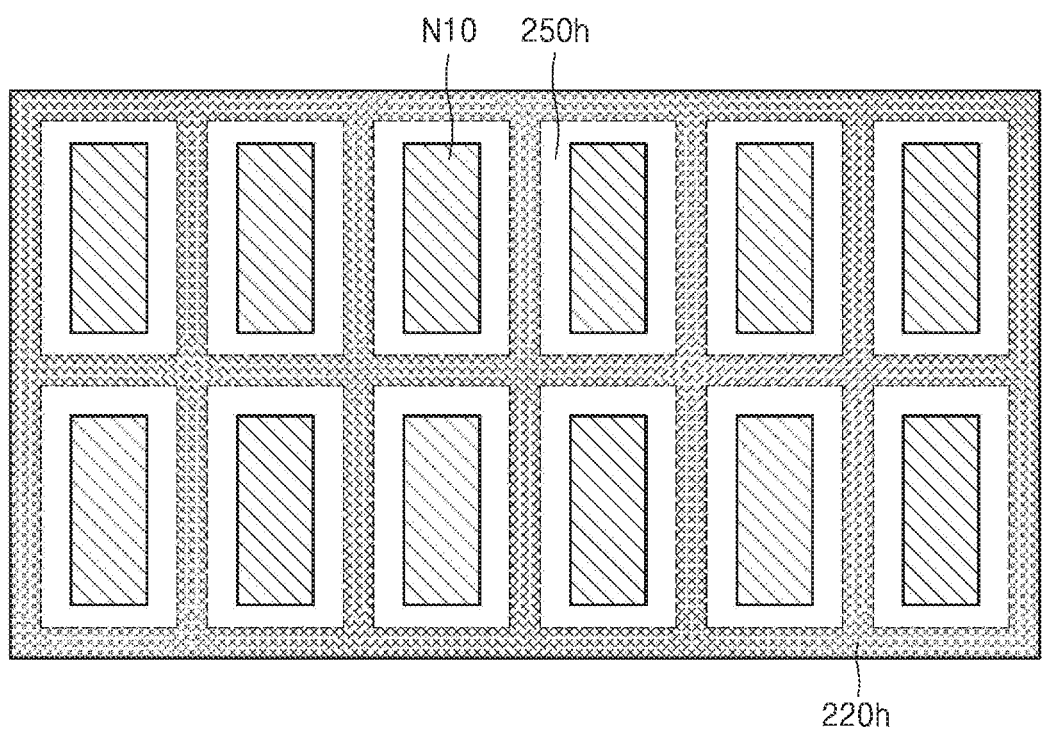

Referring to FIG. 13, a wiring structure 220a may be arranged surrounding the plurality of nano-antennas N10. Reference number 250a indicates the second insulating layer.

In FIGS. 14 through 20, reference numbers 220b through 220h indicate wiring structures, and reference numbers 250b through 250h indicate second insulating layers. Planar structures shown in FIGS. 13 through 20 may be illustrated examples of a part of the optical modulation device, or may be illustrated examples of an alignment rule that is applied to the optical modulation device. The structures of FIGS. 13 through 20 are only illustrative, and the exemplary embodiments are not limited thereto.

According to another exemplary embodiment, in FIG. 1A and FIG. 5A, the reflector 100 may be patterned into a plurality of reflector members. Examples thereof are shown in FIGS. 21 and 22.

Figure 21:
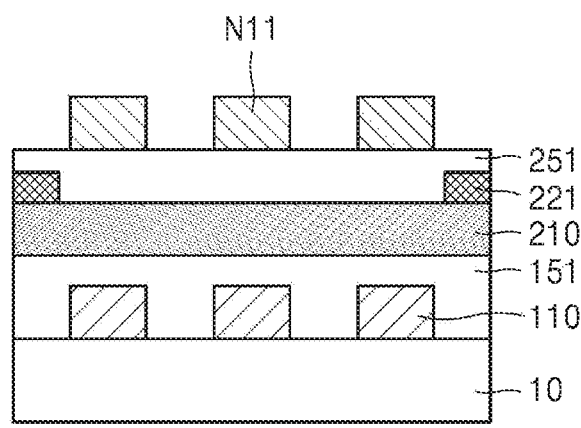
FIG. 21 is a cross-sectional view showing an optical modulation device according to another embodiment.
Figure 22:
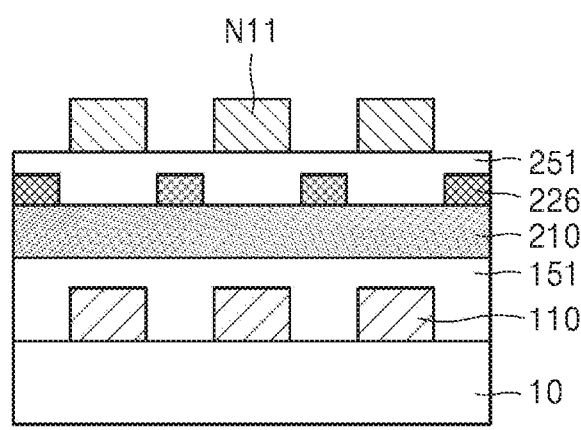
FIG. 22 is a cross-sectional view showing an optical modulation device according to another exemplary embodiment.

FIG. 21 is a cross-sectional view showing an optical modulation device according to another exemplary embodiment.

Referring to FIG. 21, a plurality of reflector members 110 may be placed apart from one another on a substrate 10. The plurality of reflector members 110 may be understood as forming a reflector array. A first insulating layer 151 covering the plurality of reflector members 110 may be arranged on the substrate 10. An active layer 210 may be arranged on the first insulating layer 151. A second insulating layer 251 may be arranged on the active layer 210. A plurality of nano-antennas N11s may be placed apart from one another on the second insulating layer 251. The plurality of nano-antennas N11s may be placed to face the plurality of reflector members 110. A wiring structure 221 may be provided between the active layer 210 and the second insulating layer 251. The wiring structure 221 may be equal or similar to the wiring structure 220 shown in FIG. 1A.

The optical modulation device may independently apply a voltage signal to each of the plurality of reflector members 110, and independent from this, the optical modulation device may also independently apply a voltage signal to each of the plurality of nano-antennas N11. Accordingly, different voltage signals may respectively be applied to at least two of the plurality of reflector members 110, and independent from this, different voltage signals may be respectively applied to at least two of the plurality of nano-antennas N11.

FIG. 22 shows a case in which another wiring structure 226 is used, instead of the wiring structure 221 shown in FIG. 21. The wiring structure 226 may be equal or similar to the wiring structure 225 shown in FIG. 5A.

Although it is illustrated and described that one nano-antenna N11 corresponds to one reflector member 110 (i.e., 1:1 correspondence) in FIGS. 21 and 22, according to another exemplary embodiment, two or more nano-antennas N11 may correspond to one reflector member.

One reflector member 110, one nano-antenna N11 corresponding thereto, and the active layer 210 placed therebetween may be understood as forming a unit device, that is, a unit cell. A plurality of unit devices (e.g., a plurality of cells) may be arranged. Different voltage signals may be independently applied to at least two of the plurality of reflector members 110, and independent from this, different voltage signals may be respectively applied to at least two of the plurality of nano-antennas N11. Different voltages may respectively be applied to one of the reflector members 110 and one nano-antenna N11 corresponding thereto. Phase modulation of lights generated by each of the plurality of unit devices may be independently controlled. By appropriately controlling phase change of light due to the plurality of unit devices, the direction of the beam irradiated from the plurality of devices may be steered. For example, by controlling phase modulation occurring in the plurality of unit devices aligned in the first direction to sequentially decrease by $\pi/2$ at a time in the first direction, the direction of the light reflected by the plurality of unit devices may be steered in a certain direction. The above-mentioned steering method may be referred to as an optical phased array type of beam steering. By adjusting phase shift rules of the phased array, a steering direction of the light may be variously adjusted. The above-mentioned phase modulation may be similarly implemented in the optical modulation devices shown in FIGS. 1A and 5A.

FIGS. 23A through 23F are cross-sectional views showing a method of manufacturing an optical modulation device, according to an exemplary embodiment.

Figure 23A:
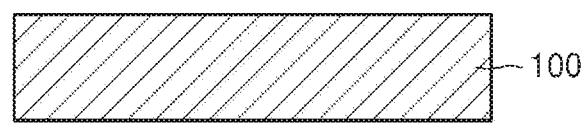
FIGS. 23A, 23B, 23C, 23D, 23E and 23F are cross-sectional views showing a method of manufacturing an optical modulation device, according to an exemplary embodiment.

Referring to FIG. 23A, the reflector 100 may be prepared. The reflector 100 may be a back reflector electrode. The reflector 100 may be formed from a certain conductive material such as a metal. For example, the reflector 100 may include at least one of metals selected from among Cu, Al, Ni, Fe, Co, Zn, Ti, Ru, Rh, Pd, Pt, Ag, Os, Ir, Au, and the like, and may also include an alloy including at least one of the above-mentioned metals. Alternatively, the reflector 100 may also include a thin film in which metal nano particles of Au, Ag, and the like are scattered, a carbon nanostructure, for example, graphene, CNT, and the like, a conductive polymer, for example, PEDOT, PPy, P3HT, and the like, or a conductive oxide.

Figure 23B:

Referring to FIG. 23B, the first insulating layer 150 may be formed on the reflector 100. For example, the first insulating layer 150 may include at least one of an insulating silicon compound or an insulating metal compound. The insulating silicon compound may include, for example, $SiO_x$, $Si_xN_y$, SiON, and the like, and the insulating metal compound may include, for example, $Al_2O_3$, HfO, ZrO, HfSiO, and the like. However, the materials included in the first insulating layer 150 mentioned herein are only illustrative and are not limited thereto.

Figure 23C:
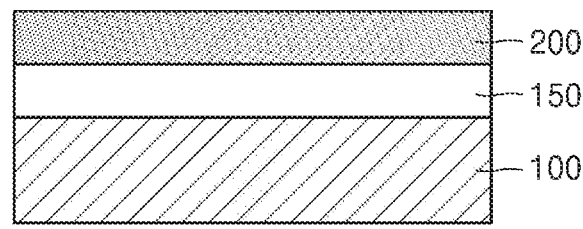

Referring to FIG. 23C, the active layer 200 may be formed on the first insulating layer 150. According to the electrical conditions related to the active layer 200 and the peripheral region of the same, the permittivity or refractivity of the active layer 200 may be changed. The active layer 200 may, for example, include a TCO like ITO, IZO, AZO, GZO, AGZO, and GIZO. The active layer 200 may also include a transition metal nitride (TMN) like titanium nitride (TiN), zirconium nitride (ZrN), hafnium nitride (HfN), and tantalum nitride (TaN). In addition, the active layer 200 may include an EO substance having effective permittivity that is changed in response to electrical signals. The EO substance may, for example, include a crystalline material like $LiNbO_3$, $LiTaO_3$, KTN, PZT and so on, or may include various polymers having electro-optic characteristics.

Figure 23D:
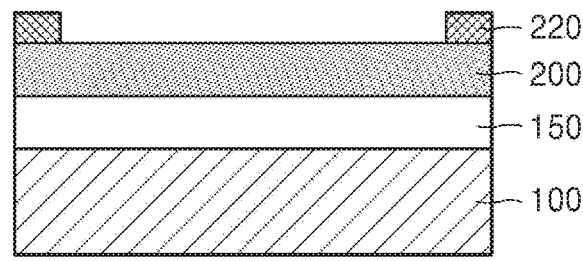

Referring to FIG. 23D, the wiring structure 220 may be formed on the active layer 200. The wiring structure 220 may include a material having higher electrical conductivity than that of the active layer 200. For example, the wiring structure 220 may be formed from metals, for example, Au, Ag, Cu, and the like. However, the exemplary embodiment is not limited thereto. The wiring structure 220 may be formed from various kinds of metals or alloys.

Figure 23E:
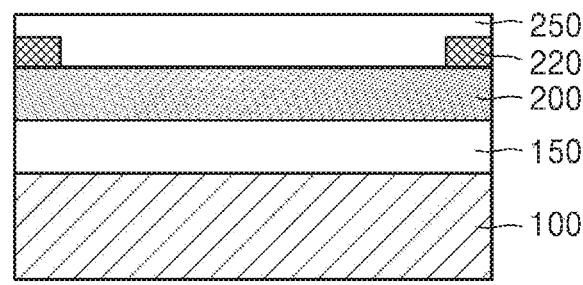

Referring to FIG. 23E, the second insulating layer 250 covering the wiring structure 220 may be formed on the active layer 200. In a remaining region except for an area in which the wiring structure 220 is formed, the second insulating layer 250 may contact the active layer 200. The second insulating layer 250 may be formed from the same material as that of the first insulating layer 150, and may also be formed from a material different from that of the first insulating layer 150.

Figure 23F:
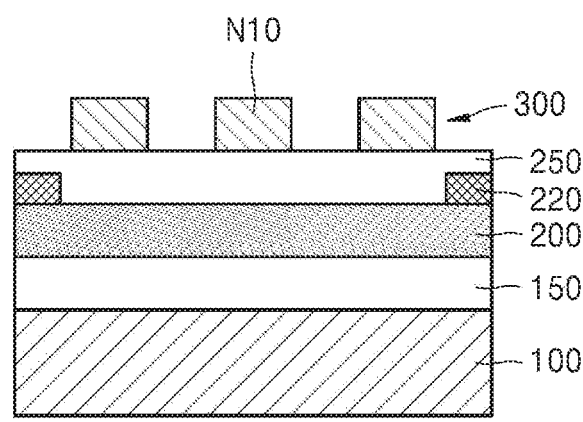

Referring to FIG. 23F, the nano-antenna array 300 including the plurality of nano-antennas N10 may be formed on the second insulating layer 250. As a conductive material forming the nano-antennas N10, a metal material having high conductivity, which may generate surface plasmon excitation, may be used. For example, at least one metal selected from among Cu, Al, Ni, Fe, Co, Zn, Ti, Ru, Rh, Pd, Pt, Ag, Os, Ir, Au, and the like, may be used, and an alloy including at least one of the above-mentioned metals may be used. Alternatively, the nano-antenna N10 may also include a thin film in which metal nano particles of Au, Ag, and the like are scattered, a carbon nanostructure, for example, graphene, CNT, and the like, a conductive polymer, for example, PEDOT, PPy, P3HT, and the like, or a conductive oxide. The wiring structure 220 may be placed not to overlap or cross the plurality of nano-antennas N10.

The method of manufacturing the optical modulation device described with reference to FIGS. 23A through 23F is only illustrated, and by modifying the method, an optical modulation device according to various exemplary embodiments described with reference to FIGS. 5A through 22 may be manufactured.

Although the nano-antennas are illustratively and simply illustrated in the exemplary embodiments described above, a structure of the nano-antenna may be variously changed.

Figure 24:
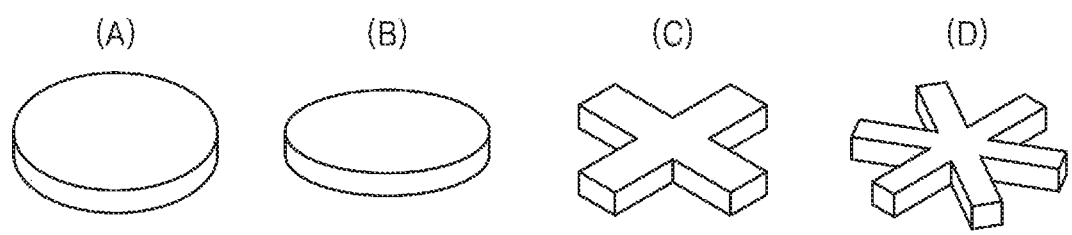
FIG. 24 is a perspective view showing various structures/forms of a nano-antenna that may be applied in the optical modulation device according to the exemplary embodiments.

FIG. 24 is a perspective view showing various structures/forms of a nano-antenna that may be applied in the optical modulation device according to the exemplary embodiments.

Referring to FIG. 24, the nano-antenna may have various structures/forms, for example, a round disc (A), an oval disc (B), a cross-type disc (C), an asterisk-type disc (D), and the like. The cross-type disc (C) may have a form in which two nanorods cross in directions perpendicular to each other, and the asterisk type disc (D) may have a star (*) form in which three nanorods cross one another. In addition, the nano-antenna may have variously modified structures, for example, cone, triangular pyramid, sphere, hemisphere, rice grain, rod, fish-bone, and the like. In addition, the nano-antenna may have a multi-layer structure made by stacking a plurality of layers, and may also have a core-shell structure including a core unit and at least one shell unit. In addition, nano-antennas having two or more different structures/forms may be periodically arranged forming a unit.

According to the structures/forms of the nano-antennas and an arrangement method thereof, a resonance wavelength, a resonance wavelength width, resonance polarization characteristics, a resonance angle, reflection/absorption/transmission characteristics, and the like may vary. Accordingly, by controlling the structures/forms of the nano-antennas, it is possible to manufacture an optical modulation device having characteristics appropriate for the purpose.

By using the optical modulation device according to the exemplary embodiments, a device that steers a beam in certain directions may be implemented.

Figure 25:
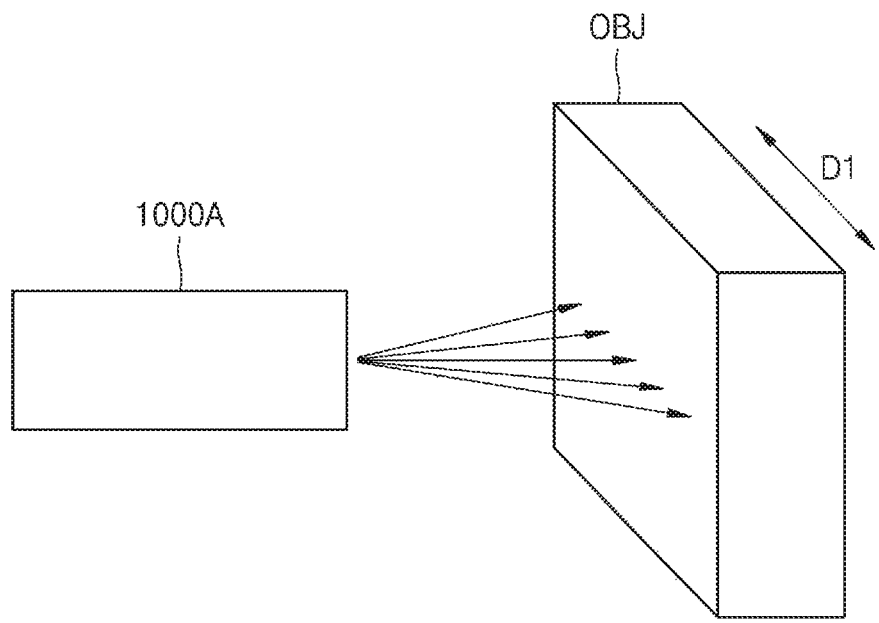
FIG. 25 is a conceptual diagram for describing a beam steering device including an optical modulation device according to an exemplary embodiment.

FIG. 25 is a conceptual diagram for describing a beam steering device 1000A including an optical modulation device according to an exemplary embodiment.

Referring to FIG. 25, a direction of a beam may be steered in a one-dimensional direction by using a beam steering device 1000A. In other words, the direction of the beam may be steered in a first direction toward a subject OBJ. The beam steering device 1000A may include a one-dimensional array of a plurality of optical modulation devices according to the exemplary embodiments of the present disclosure.

Figure 26:
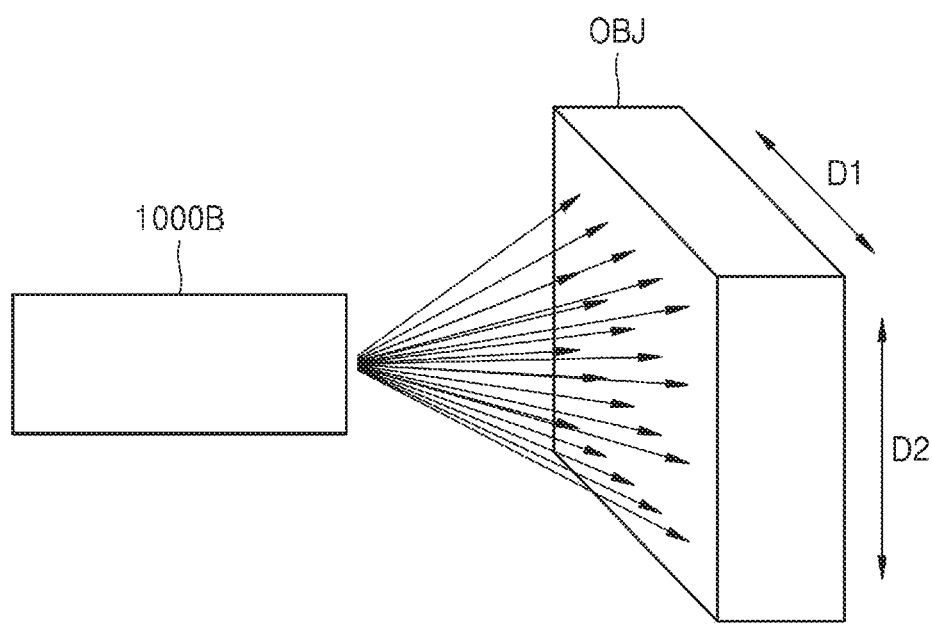
FIG. 26 is a conceptual diagram for describing a beam steering device including an optical modulation device according to another exemplary embodiment.

FIG. 26 is a conceptual diagram for describing a beam steering device 1000B including an optical modulation device according to another exemplary embodiment.

Referring to FIG. 26, a direction of a beam may be steered in a two-dimensional direction by using the beam steering device 1000B. That is, the direction of the beam may be steered towards a subject OBJ, in the first direction D1 and a second direction D2 perpendicular thereto. The beam steering device 1000B may include a two-dimensional array according to the exemplary embodiments. The beam steering devices 1000A and 1000B described with reference to FIGS. 25 and 26 may be non-mechanical ultrafast beam scanning apparatuses.

Figure 27:
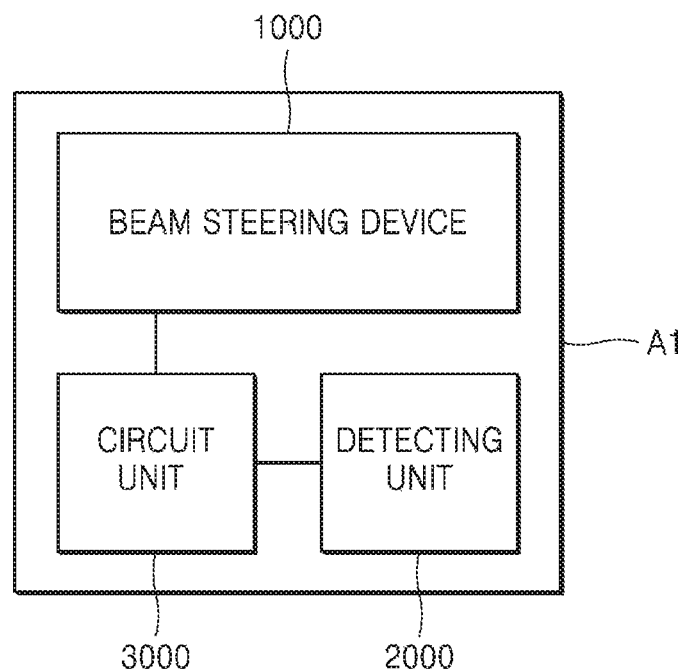
FIG. 27 is a block diagram for describing an overall system of an optical apparatus including a beam steering device, to which an optical modulation device, according to an exemplary embodiment, is applied.

FIG. 27 is a block diagram for describing an overall system of an optical apparatus A1 including a beam steering device to which an optical modulation device, according to an exemplary embodiment, is applied.

Referring to FIG. 27, the optical apparatus A1 may include a beam steering device 1000. The beam steering device 1000 may include the optical modulation device that is described with reference to FIGS. 1A, 1B, 5A through 22, and the like. The optical apparatus A1 may include a light source unit in the beam steering device 1000 or a light source unit that is provided separately from the beam steering device 1000. The optical apparatus A1 may include a detecting unit (e.g., an optical sensor, a depth-sensing camera, an infrared sensor, etc.) 2000 that is used for detecting a light that is steered by the beam steering device 1000 and reflected by a subject. The detecting unit 2000 may include a plurality of light detection elements and may further include other optical members. In addition, the optical apparatus A1 may further include a circuit unit 3000 that is connected to at least one of the beam steering device 1000 and the detecting unit 2000. The circuit unit 3000 may include a calculation unit (e.g., a microprocessor, a central processing unit, etc.) that acquires data and performs calculations thereon, and may further include a driving unit, a control unit, and the like. The circuit unit 3000 may further include a power unit, memory, and the like.

Although FIG. 27 shows a case in which the optical apparatus A1 includes the beam steering device 1000 and the detecting unit 2000 in the same single apparatus, the beam steering device 1000 and the detecting unit 2000 may be separately provided in two different apparatuses, instead of in one same apparatus. In addition, the circuit unit 3000 may be connected to the beam steering device 1000 or the detecting unit 2000 by wireless communication instead of wired communication. The configuration shown in FIG. 27 may be variously modified.

The beam steering device according to the exemplary embodiments described above may be adopted in various optical apparatuses. For example, the beam steering device may be adopted in a Light Detection And Ranging (LiDAR) apparatus. The LiDAR apparatus may be a phase-shift type apparatus or a time-of-flight (TOF) type apparatus. The LiDAR apparatus may be applied to an autonomous vehicle, a flying object like a drone, a mobile apparatus, small walking means (e.g., a bicycle, a motorcycle, a perambulator, a skateboard, and the like), robots, supporting means for humans/animals (e.g., a cane, a helmet, accessories, clothing, a watch, a back, an Internet of Things (IoT) apparatus/system, a security apparatus/system, and the like.

Figure 28:
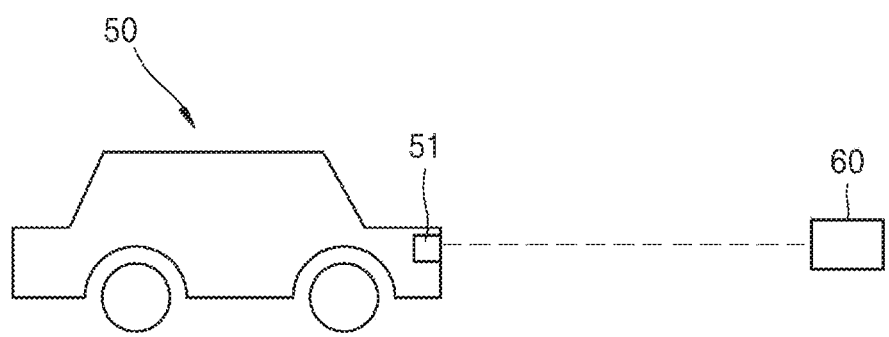
FIGS. 28 and 29 are conceptual diagrams showing cases in which a LiDAR apparatus including an optical modulation device according to an exemplary embodiment is used in a vehicle.
Figure 29:
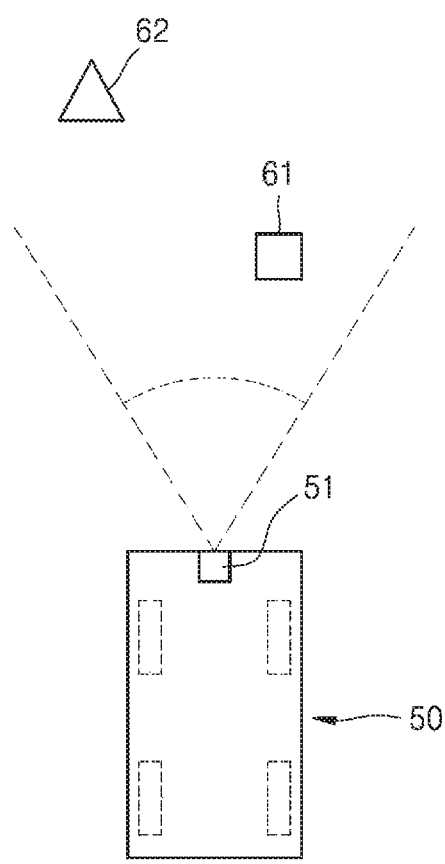

FIGS. 28 and 29 are conceptual diagrams showing cases in which a LiDAR apparatus including an optical modulation device is used in a vehicle, according to an exemplary embodiment. FIG. 28 is a drawing taken from a side, and FIG. 29 is a drawing taken from the top.

Referring to FIG. 28, a LiDAR apparatus 51 may be adopted to a vehicle 50, and data regarding a subject 60 may be acquired by using the LiDAR apparatus 51. The vehicle 50 may be an automobile having an autonomous driving function. By using the LiDAR apparatus 51, the subject 60, that is, an object or a person in a direction in which the vehicle proceeds, may be detected. In addition, a distance from the vehicle 50 to the subject 60 may be measured by using data, for example, a time gap between a transmission signal and a detection signal. In addition, as shown in FIG. 29, data regarding a subject 61 near the vehicle 50 within a scanning range and data regarding a subject 62 far from the vehicle 50 may be obtained.

The optical modulation device according to various exemplary embodiments may be adopted in various optical apparatuses except for LiDAR. For example, as the optical modulation device according to various exemplary embodiments may be used for acquiring three-dimensional data regarding a space and a subject, the optical modulation device may be applied to the 3D image acquisition apparatus or a three-dimensional camera, and the like. In addition, the optical modulation device may also be applied to a holographic display apparatus or a structured light generation apparatus. The optical modulation device may also be applied to various optical components/apparatuses, for example, various beam scanning apparatuses, a hologram generation apparatus, an optical coupling apparatus, a variable focus lens, a depth sensor, and the like. The optical modulation device may also be applied to various technical fields using "a meta surface" or a "meta structure". In addition, the optical modulation device according to exemplary embodiments and the apparatus including the same may be applied to various optic and electronics fields for various purposes.

The foregoing exemplary embodiments are merely exemplary and are not to be construed as limiting. For example, one of ordinary skill in the art may understand that the configuration of the optical element described with reference to FIGS. 1A, 1B, 5A, through 22 may be variously modified. More particularly, a part of the wiring structure may overlap a part of the nano-antennas. In addition, at least a part of the wiring structure may have a curved or an arbitrary form other than a straight form. The technical spirit of the present disclosure may also be applied to a case in which one optical modulation device includes a plurality of active layers (the plurality of active layers that are stacked apart from one another). In addition, application of the optical modulation device according to the exemplary embodiments is not limited to what is described above and may be variously changed. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An optical modulation device comprising:
a reflector;
a nano-antenna array placed opposite to the reflector and comprising a plurality of nano-antennas;
an active layer that is placed between the reflector and the nano-antenna array and having properties that vary according to electrical conditions;
a first insulating layer placed between the reflector and the active layer;
a second insulating layer placed between the active layer and the nano-antenna array; and
a wiring structure that is provided to electrically contact the active layer, in at least one of a first place between the active layer and the first insulating layer, and a second place between the active layer and the second insulating layer, and has a higher electrical conductivity than the active layer.

2. The optical modulation device of claim 1, wherein the wiring structure is disposed around the plurality of nano-antennas.

3. The optical modulation device of claim 1, wherein the wiring structure is provided at an edge region of the active layer and surrounds an internal region of the active layer.

4. The optical modulation device of claim 1, wherein the wiring structure comprises:
a first wiring unit provided at an edge region of the active layer; and
a second wiring unit that crosses an internal region of the edge region of the active layer.

5. The optical modulation device of claim 4, wherein the second wiring unit connects a first part and a second part of the first wiring unit to each other.

6. The optical modulation device of claim 1, wherein the wiring structure has a grid form.

7. The optical modulation device of claim 1, wherein the wiring structure is disposed around each of the plurality of nano-antennas.

8. The optical modulation device of claim 1, wherein the wiring structure is placed not to overlap the plurality of nano-antennas.

9. The optical modulation device of claim 1, wherein the wiring structure comprises a metal or an alloy.

10. The optical modulation device of claim 1, wherein the optical modulation device is configured to apply a reference voltage to the active layer via the wiring structure.

11. The optical modulation device of claim 1, wherein the optical modulation device is configured to independently apply voltages to at least two of the reflector, the active layer, and the nano-antenna array.

12. The optical modulation device of claim 1, wherein
the reflector comprises a plurality of reflector members that are disposed apart from one another, wherein
the plurality of reflector members are placed to respectively correspond to the plurality of nano-antennas.

13. The optical modulation device of claim 12, wherein
the optical modulation device is configured to independently apply a first voltage to each of the plurality of reflector members and independently apply a second voltage to each of the plurality of nano-antennas.

14. The optical modulation device of claim 1, wherein
the wiring structure comprises at least one of a first wiring structure, which is provided between the active layer and the first insulating layer, and a second wiring structure, which is provided between the active layer and the second insulating layer.

15. The optical modulation device of claim 1, wherein
the active layer comprises an electro-optic material having permittivity that varies according to an electrical signal applied to the electro-optic material.

16. The optical modulation device of claim 1, wherein
the active layer comprises at least one of a transparent conductive oxide and a transition metal nitride.

17. The optical modulation device of claim 1, wherein
the optical modulation device is configured to derive phase modulation of light that is reflected by the nano-antennas.

18. An optical apparatus comprising the optical modulation device of claim 1.

19. The optical apparatus of claim 18, wherein
the optical apparatus is configured to one-dimensionally or two-dimensionally steer a beam by using the optical modulation device.

20. The optical apparatus of claim 18, wherein
the optical apparatus comprises at least one of a Light Detection And Ranging (LiDAR) apparatus, a three-dimensional image acquisition apparatus, a holographic display apparatus, and a structured light generation apparatus.

* * * * *